United States Patent
Arimilli et al.

(10) Patent No.: US 6,675,270 B2
(45) Date of Patent: Jan. 6, 2004

(54) DRAM WITH MEMORY INDEPENDENT BURST LENGTHS FOR READS VERSUS WRITES

(75) Inventors: Ravi Kumar Arimilli, Austin, TX (US); Warren Edward Maule, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 09/843,060

(22) Filed: Apr. 26, 2001

(65) Prior Publication Data

US 2002/0161966 A1 Oct. 31, 2002

(51) Int. Cl.[7] .............................................. G06F 13/00
(52) U.S. Cl. ...................... 711/155; 711/142; 711/143; 711/156
(58) Field of Search ................................ 711/105, 117, 711/141–145, 155, 156

(56) References Cited

U.S. PATENT DOCUMENTS 5,491,811 A * 2/1996 Arimilli et al. ............. 711/144
5,924,121 A * 7/1999 Arimilli et al. ............. 711/143
6,128,707 A   10/2000 Arimilli et al.

* cited by examiner

Primary Examiner—T. V. Nguyen
(74) Attorney, Agent, or Firm—Casimer K. Salys; Bracewell & Patterson, L.L.P.

(57) ABSTRACT

A method and system that enables independent burst lengths for reads and writes to a DRAM subsystem. Specifically, the method provides a mechanism by which read bursts may be longer than write bursts since there are statistically more reads than writes to the DRAM and only some beats of read data are modified and need to be re-written to memory. In the preferred embodiment, the differences in the burst length is controlled by an architected address tenure, i.e., a set of bits added to the read and write commands that specify the specific number of beats to read and/or write. The bits are set by the processor during generation of the read and write commands and prior to forwarding the commands to the memory controller for execution.

20 Claims, 4 Drawing Sheets

DRAM WITH MEMORY INDEPENDENT BURST LENGTHS FOR READS VERSUS WRITES

BACKGROUND OF THE INVENTION

1. Technical Field

The present invention generally relates to computer memory subsystems, and more particularly to a Dynamic Random Access Memory (DRAM) subsystem. Still more particularly, the present invention relates to independent burst lengths for reads and writes in a DRAM subsystem.

2. Description of the Related Art

DRAM subsystems are well known in the art. A typical DRAM cell uses the gate capacitance of one or more field-effect transistors to provide the storage of a binary state. The charge on this capacitor will eventually leak and the DRAM cell may change state, causing an incorrect bit to be set or reset in memory. This problem is typically solved by a refresh scheme, which allows the gate of the field-effect transistors to be recharged according to the value stored in the cell, before sufficient discharge has occurred to cause an error.

In a typical DRAM memory system, one processor usually has control of the memory at a given time. Address lines and data lines are driven by the processor or buffers attached to the processor address and data signals.

The typical DRAM is formed by thousands of individual memory cells arranged in a matrix-like configuration. Each DRAM cell includes a capacitor which is electrically charged or discharged in a "write" operation. The charge establishes a voltage on the capacitor, and the level of the voltage represents a data bit. The data bit represented by the capacitor charge is determined by comparing the capacitor voltage to a threshold reference.

The memory cells of the DRAM matrix are addressed by signals supplied on word lines and bit lines. The word lines extend in a horizontal reference direction in the matrix and connect to the memory cells in the horizontal rows and thus intersect vertical columns of memory cells in the matrix. The bit lines extend in a vertical reference direction in the matrix and connect to the memory cells in vertical columns and thus intersect horizontal rows of cells. By energizing a selected word line, the voltage from the memory cells in the horizontal row corresponding to the selected word line are presented on the bit lines extending from each of the cells.

The DRAM memory array is usually divided into one or more segments, and each of the segments is further divided into bit blocks. Each bit block has a plurality of memory cells, and those memory cells are organized into rows and columns in a matrix. Individual words are selected by addressing the DRAM segments, selecting individual columns in the bit blocks, and selecting the desired word line.

A read or write instruction consists of an address that references a particular address space in memory. Typically, a read and a write address has a default number of beats that is read or written. In standard systems the number of beats is dependent on the architecture of the DRAM and is programmed into the system operation procedures. The number is typically programmed at power-on during system initialization and is a static value (i.e., unchangeable once initially programmed at power-on).

Data is stored in DRAM arrays in beats. A DRAM memory array that provides 128 bytes of data per line may have 8 beats of data that are 16 bytes wide. Thus, for example, if the data bus is 16 bytes wide and each read request reads 128 bytes of data from within the DRAM array, then the DRAM array provides 8 beats of data in response to the read request.

In a standard memory access operation, data is read from memory, modified by the processor, and re-written to memory. Current DRAM operations requires that the number of beats of data written back to memory must be the same as the number of beats previously read, irrespective of the number of beats that is actually modified. For example, if the read request reads a 512 byte cache line having 8 beats that are each 64 bytes in width and a subsequent process modified data in only one portion of the line, e.g., 128 bytes, then the memory must still write all 512 bytes of data.

The current DRAM systems require all 512 bytes be re-written. As processor caches become larger, more sectoring will occur to help keep directory sizes small. This will result in longer read requests to improve the efficiency of the memory subsystems. These longer read requests conflict with the shorter write requests that result from modified sectors of the caches or from the I/O data transfers. The requirement that all writes to memory be the same length as the read operations to memory will result in a loss of bandwidth due to both the writing of unmodified data and the extra read requests that may be necessary when the full length of the write data is not available (i.e., read modified write operations). Statistically, there are more reads than writes to DRAM systems during operation, and where it is generally a good practice to speculatively read the un-accessed sectors of a sectored cache, it is not an efficient use of the memory bandwidth to write back all the unmodified sectors of the cache.

In some DRAM system designs, burst write procedures are available. A burst write procedure utilizes a mask bit that, when turned on, allows the system to not write data that is being transferred for a particular number of cycles. This permits a smaller number of data to be written to the memory array than was initially read and is being transferred by the write operation. However, with burst write, although the write operation is turned off, the space on the bus is still being utilized to transmit all the data and the various memory pins have to be run at the same rate as if all the data was being re-written. Burst write procedures therefore do not assist in the efficient utilization of the system bus.

Given the time loss inherent in writing entire lines of data when only some of the data cells have been changed, the present invention recognized that it would be desirable to have write bursts of a DRAM be a different sized (i.e., smaller) from the read bursts. A method by which only that part of a memory array line that is modified is written back to memory is a welcomed improvement. These and other benefits are provided in the present invention.

SUMMARY OF THE INVENTION

A method and system that enables independent burst lengths for reads and writes to a DRAM subsystem is described. Specifically, the method provides a mechanism by which read bursts may be longer than write bursts since there are statistically more reads than writes to the DRAM and only some beats of read data are modified and need to be re-written to memory.

In the preferred embodiment, the differences in the burst length is controlled by an architected address tenure, i.e., a set of bits added to the read and write commands that specify the specific number of beats to read and/or write. The bits are set by the processor during generation of the read and write commands and prior to forwarding the commands to the memory controller for execution.

The invention finds applicability in high-performance servers, that have lots of sequential reads with small burst writes. The invention is also applicable to out-of-order high frequency central processing units (CPUs) that operate with a lot of speculation.

The above as well as additional objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
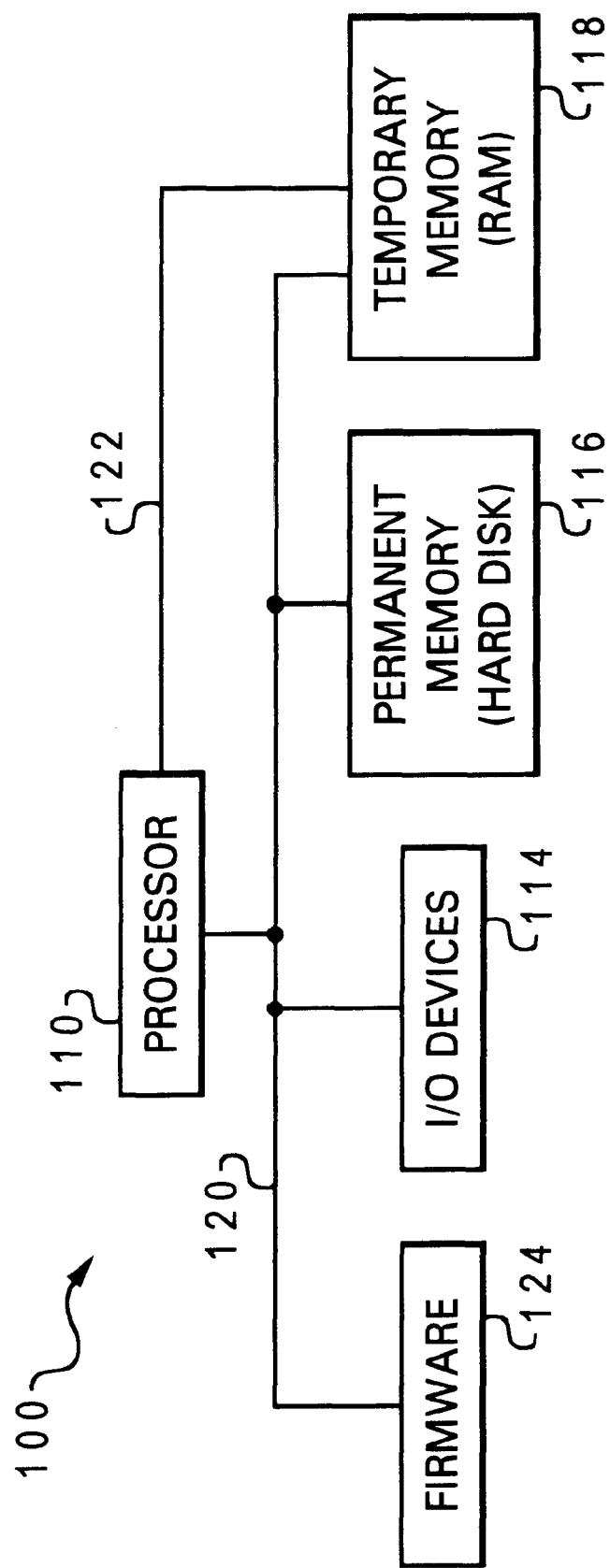
FIG. 1 depicts a block diagram of major components of a data processing system, in which a preferred embodiment of the present invention may be implemented.

With reference now to the figures and in particular with reference to FIG. 1, there is illustrated a high level block diagram of the major component parts of a data processing system that may be utilized to implement the various features of the present invention. Data processing system 100 comprises a Central Processing Unit (CPU) 110. CPU 110 is coupled to permanent (non-volatile) memory 116, peripheral input/output (I/O) devices 114, firmware 124, and temporary memory (DRAM) 118 via interconnect 120. CPU 110 is further directly coupled to DRAM 118 via memory interconnect 122.

Figure 2:
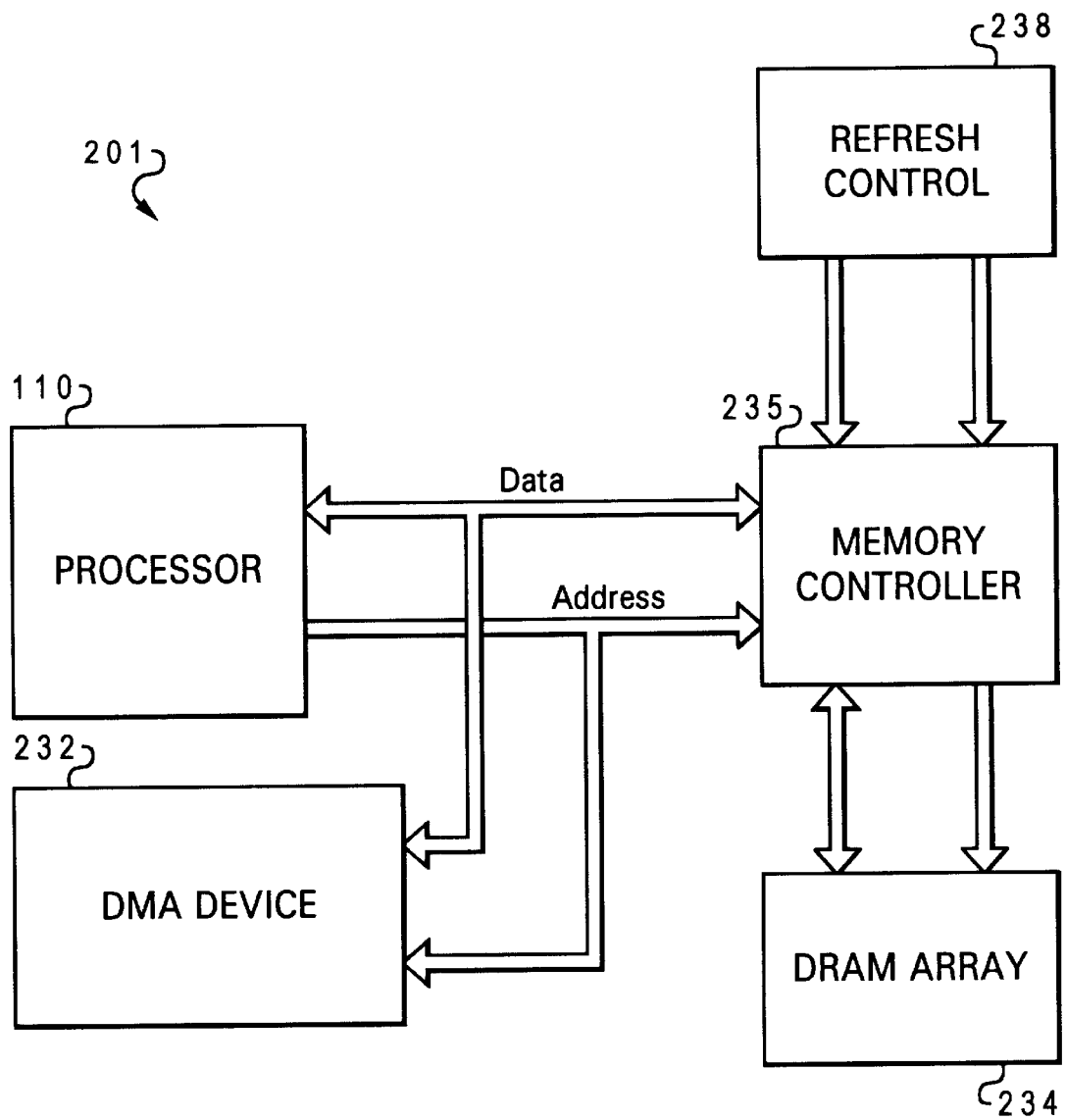
FIG. 2 depicts a block diagram of a memory subsystem within the data processing system of FIG. 1 within which a preferred embodiment of the present invention may be implemented.

The present invention is preferably implemented in a DRAM subsystem as illustrated in FIG. 2. DRAM subsystem 201 includes a DRAM array 234, which may be synonymous with temporary memory 118 of FIG. 1. DRAM array 234 is coupled to a memory controller 235, which controls all accesses, both read and write, to DRAM array 234. Requests for reads and writes are received by memory controller 235 from processor 110 as read and write commands, respectively.

Refresh Control 238 provides refresh requests to the DRAM array 234. Processor 110 and Direct Memory Access (DMA) Device 232, provide requests and data for write operations to memory controller 235. Refresh control 238 provides refresh requests to memory controller 235. Memory controller 235 accesses DRAM array 234 and provides data to processor 110 and DMA Device 232 on read operations. DRAM Array 234, is refreshed by the action of control logic through Memory Controller 235, which will further generate CAS (Column Address Select) and/or RAS signals (Row Address Select) signals within the DRAM array 234, depending on the particular refresh technique that the DRAM array 234 requires.

These signals are well known names for signals within the art of DRAM's, but should not be construed to limit the application of these circuits and techniques. DRAM array 234 can be memory that is external to the processor integrated circuit or can constitute DRAM within a processor such as L1 or L2 cache memory provided in a microprocessor or other program execution device.

The preferred embodiment of the invention modifies the read and write commands for accessing a DRAM array by providing a set of bits that designate the number of beats of data to read and or write. Thus, additional bits are added to the read and write command and the processor logic is improved to allow the processor to set the bits to the correct number of beats when the address command is being generated. The invention provides little change to the internal architecture of the overall computer system.

Figure 3:
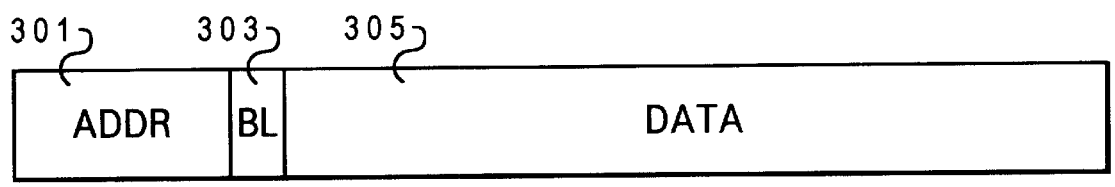
FIG. 3 illustrates a memory access read or write command with additional functional bits by which the features of the present invention are implemented in one preferred embodiment.
Figure 4:
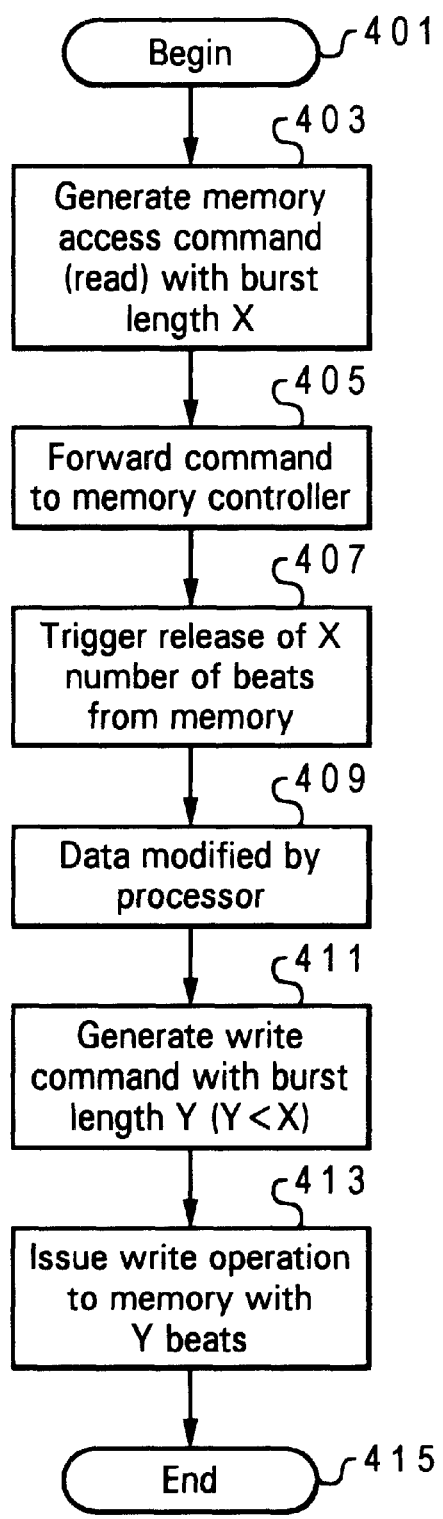
FIG. 4 is a flow chart of the process of read and write to a memory array according to a preferred implementation of the present invention.

FIG. 3 illustrates an exemplary address command with address bytes 301, data bytes 305, and additional set of bits for burst length 303. Referring now to FIG. 4, there is illustrated a flow chart of the process of reading and writing to a memory array according to the present invention. The process begins at block 401. Thereafter, when the processor seeks to access the DRAM array, the processor generates a read command as shown at block 403. The read command includes the burst length with the address and other standard parameters. Following, the processor provides the read command to the memory controller as indicated at block 405, and the memory controller interprets the received command bits for address and burst length information. The memory controller then triggers the release from the DRAM array of the given number of beats of data determined from the burst length, beginning at the provided address as depicted at block 407. Following, modification of the data is completed by the processor as shown at block 409, and then the processor generates a write command, with the beginning address corresponding to the first beat of data modified and burst length value equal to the number of beats modified as shown at block 411. The memory controller then issues the write operation to DRAM array beginning at the address provided as shown at block 413. Only the number of modified beats are re-written as specified in the burst length bits. The process then ends as indicated at block 415.

Figure 5:
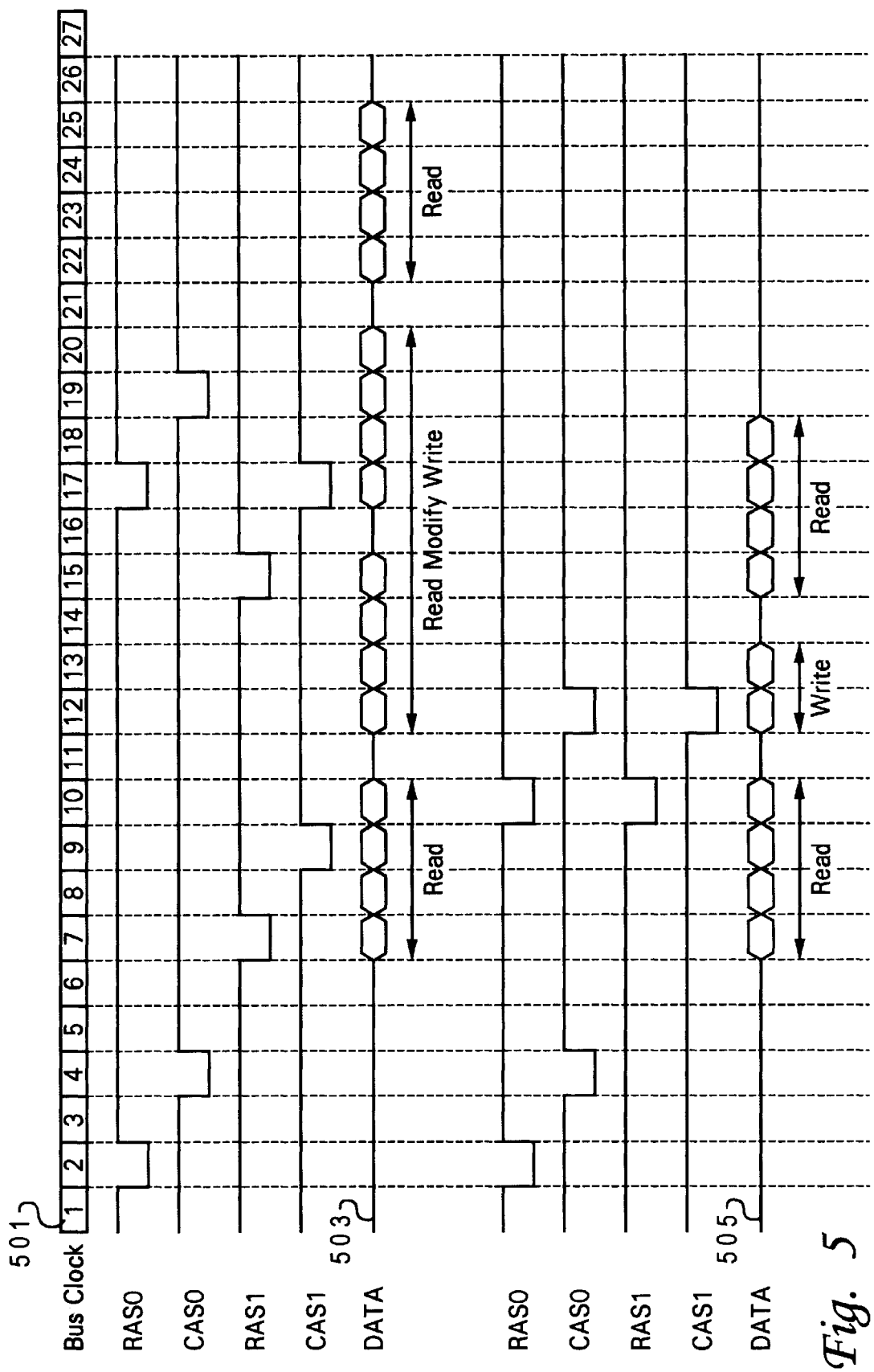
FIG. 5 is a timing diagram illustrating the time savings in clock cycles during implementation of the features of the present invention.

FIG. 5 illustrates a timing diagram of improvements in bus cycles realized when the features of the present invention are implemented. A bus clock is shown with the running cycle times 501 at the top. Data line 503 and data line 505 provide the beats for prior art application of reads and writes from and to memory and application of reads and writes from and to memory according to the present invention, respectively. As shown via data line 503, the read stage, read-modify-write stage, and subsequent read stage each operate on four beats. Read-modify-write stage utilizes 7 clock cycles because the entire four beats have to be read from memory, modified (i.e., in the present example, although only two beats are modified, the processor has to process all four beats when generating the write command), and then rewritten to the DRAM array.

However, with data line 505, the processor only has to process the modified beats, and the read-modify-write stage of data line 503 is eliminated and replaced with a simple write stage that writes only the two beats of data that have been modified. Because only the modified beats are forwarded to the memory controller, in the preferred embodiment, there is no read and compare steps required as provided in current applications that process writes as three step read-modify-write process. Thus, unlike data line 503, data line 505 only processes and writes those specific beats that are modified, and a substantial time savings is realized. In this illustrative embodiment, the features of the invention accounts for a savings of six clock cycles, freeing up the memory controller and DRAM array for other processes. Additionally, only the required beats are issued on the system bus. Thus the amount of system bus bandwidth required is substantially reduced, and the system bus bandwidth is now available for utilization by other bus transactions. The number of beats and timing illustrated provided in the above timing diagrams are done so for illustrative purposes only and not meant to be limiting on the invention.

Further analysis of the above described timing diagram indicates that when the read burst length is equal to the write burst length as in data line 503, the data bus efficiency is $10/19$ or 53%. However, with data line 505, when the read burst length is not equal to the write burst length, the data bus efficiency is $10/12$ or 83%. The difference is due to the elimination of the read-modify-write operation on all four beats of data to handle the partial burst write operation.

While the invention has been particularly shown and described with reference to a preferred embodiment, it will be understood by those skilled in the art that various changes in form and detail may be made therein without departing from the spirit and scope of the invention.

What is claimed is:

1. A memory subsystem comprising:
   a memory controller;
   a memory array coupled to said memory controller via a system bus;
   means for providing independent read and write access to said memory array via an architected address operation that replaces a read-modify-write process when writing data with a write modified-data-only process, wherein said write access comprises only a write operation and writes only those beats that have been modified from among a larger number of beats that were read.

2. The memory subsystem of claim 1, further comprising a processor interconnected to said memory array via said memory controller, wherein said processor generates a command for said write access and said read access that includes a burst length, wherein only a number of beats corresponding to a value of said burst length is accessed.

3. The memory subsystem of claim 2, wherein said means for updating only said subset further comprises:
   means for generating a write command that specifies a start address of the modified data and a burst length indicating a number of beats that has been modified; and
   means for issuing only said number of beats to said system bus utilized to transmit said modified data to said memory array.

4. The memory subsystem of claim 3, further comprising:
   a memory access command that comprises a first set of bits that contain a memory address and a second set of bits that contains a burst length, wherein said processor contains logic for setting said second set of bits and said memory controller contains logic for interpreting said second set of bits and applying said corresponding burst length to access to said memory array.

5. The memory subsystem of claim 4, wherein said burst length of a write command is less than a burst length of a corresponding, previously executed read command, wherein only a subset of beats of data accessed by said read command is re-written to said memory array.

6. The memory subsystem of claim 1, further comprising:
   means for generating a read command that reads N number of beats of data;
   means for modifying a subset of beats of data within said N number of beats; and
   means, associated with said modifying means for updating only said subset of beats containing said modified data within said memory array.

7. The memory subsystem of claim 1, wherein said architected address operation includes a set of bits that designate a number of beats of data for the write operation corresponding to the number of beats of data that has been modified.

8. The memory subsystem of claim 7, wherein further said set of bits are also utilized to designate a first number of beats of data for a read operation, wherein said first number is a default number for said number of beats of data and is changed only when the number of beats of data for the write operation is less than the first number of beats of data.

9. A computer system comprising:
   a processor; and
   a memory subsystem coupled to said processor via at least one interconnect, and which provides independent read and write access, wherein said write access is completed via an architected address operation that replaces a read-modify-write process when writing data with a write modified-data-only process, which includes only a write operation that sends only modified beats of data to a system bus utilized to transmit said modified beats of data to a memory.

10. The computer system of claim 9, wherein said memory subsystem comprises:
    a memory array;
    a memory controller coupled to said memory array via said system bus; and
    wherein said processor is interconnected to said memory array via said memory controller, wherein said processor generates a command for said write access and said read access that includes a burst length, wherein only a number of beats corresponding to a value of said burst length is accessed.

11. The computer system of claim 10, further comprising:
    processor means for generating a read command that reads N number of beats of data;
    processor means for modifying a subset of beats of data within said N number of beats; and
    means, responsive to said modifying means, for updating only said subset of beats containing said modified data within said memory array.

12. The computer system of claim 11, wherein said processor generates a write command that specifies a start address of the modified data and a burst length indicating a number of beats that has been modified.

13. The computer system of claim 12, further comprising:
    a memory access command that comprises a first set of bits that contain a memory address and a second set of bits that contains a burst length, wherein said processor contains logic for setting said second set of bits and said memory controller contains logic for interpreting said second set of bits and applying said corresponding burst length to an access to said memory array.

14. The computer system of claim 13, wherein, when said burst length of a write command is less than a burst length of a corresponding, previously executed read command, only a subset of beats of data accessed by said read command is re-written to said memory array.

15. The computer system of claim 9, wherein said architected address operation includes a set of bits that designate a number of beats of data for the write operation that is settable by the processor corresponding to the number of beats of data that has been modified during generation of the write operation.

16. The computer system of claim 15, wherein further said set of bits are also utilized to designate a first number of beats of data for a read operation, wherein said first number is a default number for said number of beats of data and is changed only when the number of beats of data for the write operation is less than the first number of beats of data.

17. A method for improving operability of a DRAM system, comprising:

providing independent burst lengths for read and write operations issued by a processor to said DRAM system; and responsive to a modification of a subset of beats of data from among N beats of data read from said DRAM system, issuing a write command to write back to memory only those beats of data that have been modified, wherein said write command is an architected address operation that replaces a read-modify-write process when writing data with a write modified-data-only process, wherein only a write operation is executed during write back to memory and only said beats of data that have been modified are issued out to a system bus during said write operation.

18. The method of claim 17, wherein said issuing step includes the step of generating a write command having an address corresponding to a start address of a first modified beat of data and an burst length indicator with the number of modified beats to be re-written to memory.

19. The method of claim 18, further comprising independently generating said burst length prior to issuing of a read and a write command from said processor.

20. The method of claim 17, further comprising generating the write command with a set of bits that designates a number of beats of data for the write operation that is settable by the processor to correspond to the number of beats of data that has been modified.

* * * * *